(12) United States Patent
Schreter

(10) Patent No.: US 10,788,998 B2
(45) Date of Patent: Sep. 29, 2020

(54) LOGGING CHANGES TO DATA STORED IN DISTRIBUTED DATA STORAGE SYSTEM

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 143 days.

(21) Appl. No.: 16/029,459

(22) Filed: Jul. 6, 2018

(65) Prior Publication Data

US 2019/0012357 A1  Jan. 10, 2019

Related U.S. Application Data

(60) Provisional application No. 62/530,075, filed on Jul. 7, 2017.

(51) Int. Cl.
*G06F 11/00* (2006.01)
*G06F 3/06* (2006.01)
(Continued)

(52) U.S. Cl.
CPC .......... *G06F 3/0631* (2013.01); *G06F 3/0604* (2013.01); *G06F 3/064* (2013.01); *G06F 3/067* (2013.01); *G06F 3/0608* (2013.01); *G06F 3/0611* (2013.01); *G06F 3/0644* (2013.01); *G06F 3/0652* (2013.01); *G06F 3/0659* (2013.01); *G06F 3/0673* (2013.01); *G06F 11/1446* (2013.01); *G06F 11/1471* (2013.01); *G06F 11/1658* (2013.01); *G06F 12/0802* (2013.01); *G06F 12/1009* (2013.01); *G06F 16/128* (2019.01); *G06F 16/134* (2019.01); *G06F 16/162* (2019.01); *G06F 16/176* (2019.01); *G06F 16/1824* (2019.01); *G06F 16/215* (2019.01); *G06F 16/2358* (2019.01); *G06F 16/245* (2019.01); *G06F 16/24552* (2019.01); *G06F 16/27* (2019.01);
(Continued)

(58) Field of Classification Search
CPC ............ G06F 11/1471; G06F 11/1458; G06F 11/1658; G06F 11/2082; G06F 11/1446; G06F 11/1469
See application file for complete search history.

(56) References Cited

U.S. PATENT DOCUMENTS 5,878,431 A   3/1999  Potterveld
7,849,223 B2 12/2010  Malkhi
(Continued)

*Primary Examiner* — Charles Ehne
(74) *Attorney, Agent, or Firm* — Mintz Levin Cohn Ferris Glovsky and Popeo, P.C.

(57) ABSTRACT

A method for logging changes to data stored in a distributed data storage system can include responding to a request to change the data stored in the distributed data storage system by generating a log entry corresponding to the change. A replica of the data can be stored at each of a first computing node and a second computing node comprising the distributed data storage system. The log entry can be added to a first log stored at the first computing node and propagated to the second computing node to add the first log entry to a second log stored at the second computing node. A crash recovery can be performed at the first computing node and/or the second computing node based on the first log and/or the second log. Related systems and articles of manufacture, including computer program products, are also provided.

16 Claims, 5 Drawing Sheets

(51) Int. Cl.

| | | |
|---|---|---|
| *G06F 17/30* | (2006.01) | |
| *G06F 16/11* | (2019.01) | |
| *H04L 29/14* | (2006.01) | |
| *G06F 11/14* | (2006.01) | |
| *H04L 29/08* | (2006.01) | |
| *G06F 16/2455* | (2019.01) | |
| *G06F 12/0802* | (2016.01) | |
| *G06F 16/16* | (2019.01) | |
| *G06F 16/182* | (2019.01) | |
| *G06F 16/176* | (2019.01) | |
| *G06F 16/13* | (2019.01) | |
| *G06F 12/1009* | (2016.01) | |
| *G06F 16/951* | (2019.01) | |
| *G06F 16/27* | (2019.01) | |
| *G06F 16/23* | (2019.01) | |
| *G06F 11/16* | (2006.01) | |
| *G06F 16/245* | (2019.01) | |
| *G06F 16/215* | (2019.01) | |

(52) U.S. Cl.
CPC ...... *G06F 16/951* (2019.01); *G06F 17/30088* (2013.01); *H04L 67/1097* (2013.01); *H04L 67/2809* (2013.01); *H04L 67/2842* (2013.01); *H04L 69/40* (2013.01); *G06F 2201/84* (2013.01); *G06F 2201/85* (2013.01); *G06F 2212/604* (2013.01); *G06F 2212/652* (2013.01)

(56) References Cited

U.S. PATENT DOCUMENTS

| | | |
|---|---|---|
| 8,760,460 B1 | 6/2014 | Kilgariff |
| 9,087,020 B1 | 7/2015 | Amacker |
| 10,158,642 B2 * | 12/2018 | Jujjuri .................... G06F 16/27 |
| 10,298,640 B1 | 5/2019 | Luke |
| 2006/0045111 A1 | 3/2006 | Sinha |
| 2006/0271705 A1 | 11/2006 | Garcia-Luna-Aceves |
| 2009/0150566 A1 | 6/2009 | Malkhi |
| 2009/0216936 A1 | 8/2009 | Chu |
| 2010/0002506 A1 | 1/2010 | Cho |
| 2010/0027351 A1 | 2/2010 | Seol |
| 2010/0293140 A1 | 11/2010 | Nishiyama |
| 2011/0197023 A1 | 8/2011 | Iwamitsu |
| 2012/0246190 A1 | 9/2012 | Surtani |
| 2013/0080348 A1 | 3/2013 | Pantaliano |
| 2013/0275656 A1 | 10/2013 | Talagala |
| 2013/0275818 A1 | 10/2013 | Okubo |
| 2014/0059290 A1 | 2/2014 | Ross |
| 2014/0215179 A1 | 7/2014 | Matsuhira |
| 2014/0279920 A1 * | 9/2014 | Madhavarapu ......... G06F 16/21 707/649 |
| 2014/0289358 A1 | 9/2014 | Lindamood et al. |
| 2014/0304409 A1 | 10/2014 | Kamath |
| 2015/0058291 A1 * | 2/2015 | Earl .................... G06F 11/1471 707/625 |
| 2015/0089185 A1 | 3/2015 | Brandyberry |
| 2016/0026672 A1 | 1/2016 | Zhang |
| 2016/0105471 A1 | 4/2016 | Nunes et al. |
| 2016/0308968 A1 | 10/2016 | Friedman |
| 2017/0134276 A1 | 5/2017 | White |
| 2017/0295061 A1 | 10/2017 | Wittenschlaeger |
| 2019/0171762 A1 | 6/2019 | Luke |
| 2019/0205993 A1 | 7/2019 | Rodriguez |

* cited by examiner

LOGGING CHANGES TO DATA STORED IN DISTRIBUTED DATA STORAGE SYSTEM

RELATED APPLICATION

This application claims priority to U.S. Provisional Application No. 62/530,075 entitled MULTI-CLOUD TOPOLOGY AND CONTAINER METADATA MANAGEMENT and filed on Jul. 7, 2017, the disclosure of which is incorporated herein by reference in its entirety.

TECHNICAL FIELD

The subject matter described herein relates generally to distributed computing and more specifically to logging changes applied to data stored in a distributed data storage system.

BACKGROUND

A distributed data storage system can store data across multiple computing nodes. These computing nodes can be located across different racks, availability zones, and/or data centers in the distributed data storage system. Furthermore, the distributed data storage system can be configured to store data from multiple tenants. Data from each individual tenant can be organized into one or more data partitions and stored in at least one data container. Moreover, each data partition can be stored in one of the computing nodes in the distributed data storage system. As such, locating data within the distributed data storage system, for example, in order to respond to a query (e.g., a structured query language (SQL) statement and/or the like), can require identifying the data partition and/or the data container holding the data. Alternatively and/or additionally, locating data within the distributed data storage system can require identifying the data center, availability zone, rack, and/or computing node storing the data.

SUMMARY

Systems, methods, and articles of manufacture, including computer program products, are provided for page based data persistency. In one aspect, there is provided a system. The system may include at least one data processor and at least one memory. The at least one memory may store instructions that result in operations when executed by the at least one data processor. The operations may include: responding to a request from a client to apply a change to data stored in the distributed data storage system by at least generating a first log entry corresponding to the change, a replica of the data being stored at each of a first computing node and a second computing node comprising the distributed data storage system; adding the first log entry to a first log stored at the first computing node; propagating, to the second computing node, the first log entry, the first log entry being propagated to the second computing node in order to add the first log entry to a second log stored at the second computing node; and performing, based at least on the first log and/or the second log, a crash recovery at the first computing node and/or the second computing node.

In some variations, one or more features disclosed herein including the following features can optionally be included in any feasible combination. An index associated with the first log entry can be incremented in response to the first log entry having been added to the second log stored at the second computing node. The index can be incremented to at least indicate the first log entry as being a last valid log entry in the first log and the second log. The performance of the crash recovery can include: replaying, at the first computing node and/or the second computing node, the first log entry based at least on the truncation index associated with the first log entry being equal to and/or greater than a truncation index associated with a second log entry preceding the first log entry in the first log and/or the second log, the replaying of the first log entry comprising applying the change to a snapshot of the data stored at the first computing node and/or the second computing node, and the snapshot being created at a checkpoint prior to a crash at the first computing node and/or the second computing node. The first log and the snapshot of the data stored at the first computing node can be stored in a same data store at the first computing node.

In some variations, the performance of the crash recovery can include: omitting a replay of a second log entry succeeding the first log entry in the first log and/or the second log based at least on the truncation index associated with the first log entry being greater than a truncation index associated with the second log entry.

In some variations, the first log entry can include a log segment storing a portion of the first log and/or the second log. The first log entry can be retrieved based at least on a segment anchor and/or a segment snapshot associated with the log segment. The segment snapshot can include one or more page references to data pages at the first computing node and/or the second computing node storing the log segment. The segment anchor can store a page reference to data pages at the first computing node and/or the second computing node storing the segment snapshot. A segment index including an offset associated with first log entry can be generated. The segment index can be generated in response to the performance of the crash recovery at the first computing node and/or the second computing node. The retrieval of the first log entry can be further based on the segment index.

In some variations, the first log entry can include a header and a content. The header can include a size of the first log entry and a checksum of the content comprising the first log entry. The first log entry can further include a page list based at least on the content of the first log entry exceeding a threshold size. The page list can include one or more page references to data pages storing surplus content from the first log entry. The first log entry can represent an operation on a state machine. The state machine can track a state of data in a key-value store. The page list can be stored as part of a value comprising the key-value pair. A key of the key-value pair and a portion of the value including the page list can be stored in an in-memory key-value store. The page list is reused instead of being copied.

In some variations, the first computing node can be a leader node in a consensus protocol. The second computing node can be a follower node in the consensus protocol. The consensus protocol can include the leader node responding to the request from the client and the corresponding change being propagated to the follower node. The consensus protocol can be applied in order to maintain consistency across the replica of the data stored at each of the first computing node and the second computing node.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
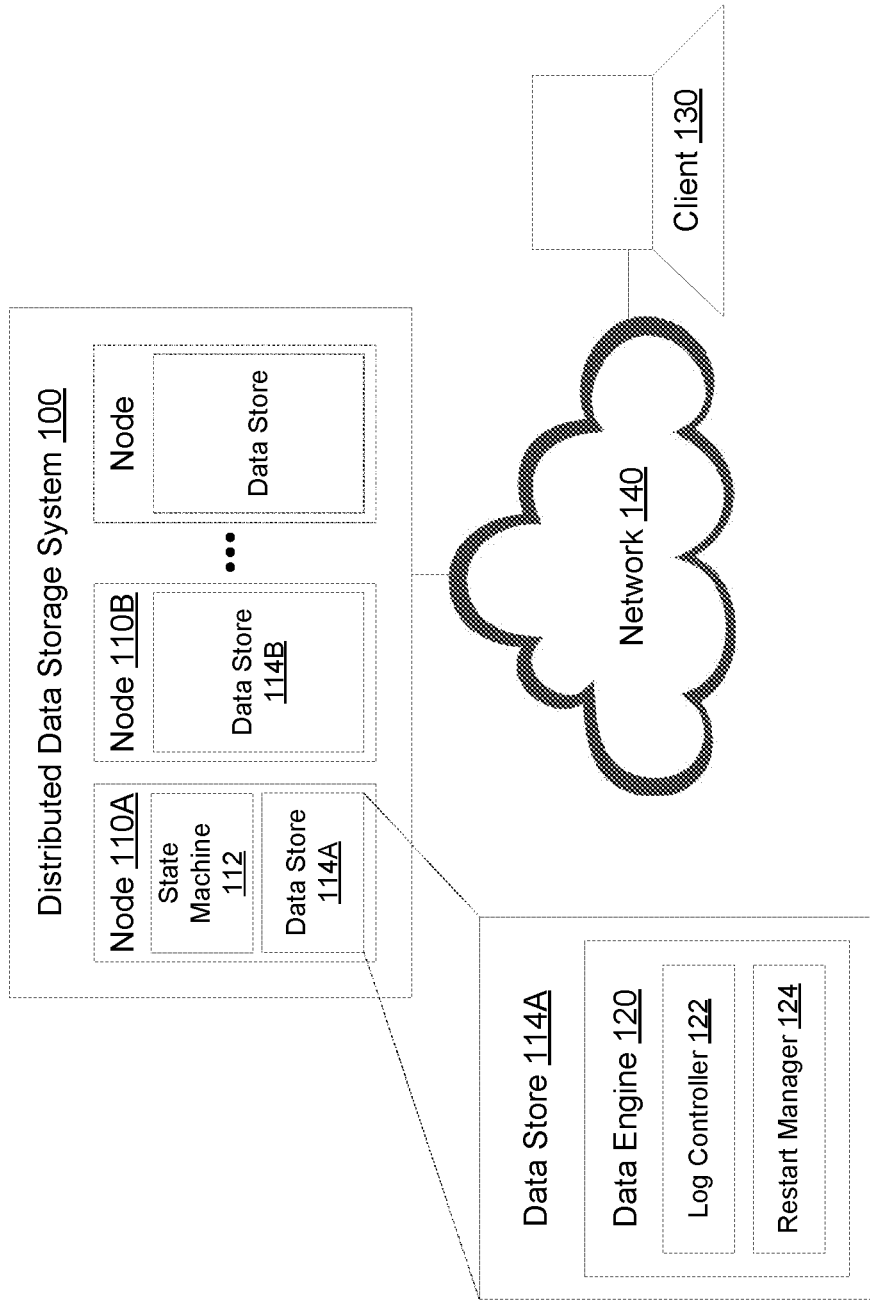
FIG. 1 depicts a system diagram illustrating a distributed data storage system consistent with some implementations of the current subject matter.

A distributed data storage system can include a plurality of computing nodes, each of which storing data in fixed and/or variable sized blocks of memory such as, for example, data pages and/or the like. Each computing node in the distributed data storage system can be associated with a state machine configured to track changes to the data stored at the computing node. For instance, applying changes to the data stored at a computing node can trigger one or more state transitions at the state machine associated with the computing node. Snapshots of the state machine can be created at various checkpoints in order to capture the state of the data stored at the computing node at each checkpoint. Furthermore, the changes applied to the data subsequent to a checkpoint can be recorded in a log such as, for example, a write ahead log and/or the like. In the event of a crash at the computing node, the data at the computing node can be restored to a state prior to the crash by at least applying the changes in the log to a snapshot of the state machine created prior to the crash.

In some implementations of the current subject matter, both snapshots of the state machine created at various checkpoints and the corresponding logs of changes applied to the data at the computing node can be stored in a same data store at the computing node instead of separate data stores. For example, both a snapshot of the state machine at a checkpoint and a log of changes applied to the data at the computing node subsequent to the checkpoint can be stored in one or more fixed size and/or variable size data pages at the computing node. In the event of a crash at the computing node, the log and the snapshot of the state machine can be retrieved from the data pages storing the log and the snapshot of the state machine. Furthermore, the data at the computing node can be restored to a state prior to the crash by at least applying the changes recorded in the log to the snapshot of the state machine.

In some implementations of the current subject matter, the log can be divided into a plurality of log segments and stored in a corresponding plurality of log pages. For example, each log segment can include a portion of the log not exceeding a threshold size. Meanwhile, each log page can have sufficient capacity (e.g., 2 megabytes and/or a different capacity) for storing one of the plurality of log segments. According to some implementations of the current subject matter, a log segment can include a series of log entries, each of which corresponding to a change applied to the data stored at the computing node. A log entry can include a fixed size header that includes a size of the log entry (e.g., in quantity of bytes) and a checksum of the content of the log entry. The content of the log entry can include an index sequence, a term sequence, a truncation index, the change applied to the data stored at the computing node, and/or any additional data required to replicate the change during a crash recovery at the computing node. The index sequence alone may be sufficient to perform crash recovery on data that is stored locally. By contrast, the term sequence and the truncation index may be required to perform crash recovery in a distributed data storage system that implements, for example, a consensus protocol to propagate changes in the data stored across multiple computing nodes within the distributed data storage system. Examples of consensus protocols consistent with some implementations of the current subject matter are described in U.S. patent application Ser. No. 15/363,738.

In some implementations of the current subject matter, surplus content from the log entry that exceeds a threshold size can be stored in one or more data pages separate from the log segment. As such, the log entry can also include a page list of these data pages storing surplus content from the log entry. Instead of being copied, this page list can be reused. As such, most of the data stored in a large log entry can be written only a single time instead of being written to a log first before being stored to a secondary data store, as is required for maintaining a conventional log. Obviating the same data being stored multiple times can give rise to significant performance improvements.

In some implementations of the current subject matter, crash recovery at the computing node can include replaying at least a portion of the log entries included in the log, for example, by applying, to the snapshot of the state machine created prior to the crash, the change corresponding to these log entries. It should be appreciated that the replaying of log entries can include identifying a last valid log entry that can be replayed based on the index sequence, the term sequence, and the truncation index associated with the log entries included in the log. For example, a log entry can be replayed if that log entry is associated with an equal and/or greater index sequence, term sequence, and/or truncation index that a preceding log entry. Accordingly, the crash recovery at the computing node can include replaying the log entries until encountering a log entry that is associated with a lower index sequence, term sequence, and/or truncation index than a preceding log entry. Alternatively and/or additionally, the crash recovery at the computing node can include replaying the log entries until encountering an invalid log entry having a mismatched cyclic redundancy check (CRC) value, invalid size value, and/or the like.

In some implementations of the current subject matter, the distributed data storage system can store replicas of the same data across a cluster of computing nodes including, for example, the corresponding snapshot, log, and/or data directory. Consistency across the replicas of the snapshot, log, and/or data directory stored at different computing nodes can be maintained by implementing a consensus protocol across the cluster of computing nodes. For example, changes to the data stored at a computing node serving as the leader node can be propagated to the other computing nodes acting as follower nodes. Nevertheless, a crash at one or more of the computing nodes can necessitate the performance of crash recovery before new log entries added to the log stored at the leader node can be propagated to the follower nodes. Thus, according to some implementations of the current subject matter, the truncation index associated with the last log entry that is fully propagated across the cluster of computing nodes can be incremented in order to designate that log entry as the last valid log entry. During crash recovery, all log entries up until the last valid log entry can be replayed at each computing node within the cluster of computing nodes.

FIG. 1 depicts a system diagram illustrating a distributed data storage system 100 consistent with implementations of the current subject matter. Referring to FIG. 1, the distributed data storage system 100 can include a plurality of computing nodes including, for example, the first computing node 110A and the second computing node 110B. Furthermore, as shown in FIG. 1, the distributed data storage system 100 can be communicatively coupled, via a network 140, with one or more clients including, for example, a client 130. The network 140 can be any wired and/or wireless network including, for example, a public land mobile network (PLMN), a local area network (LAN), a virtual local area network (VLAN), a wide area network (WAN), the Internet, and/or the like. Meanwhile, the client 130 can be any processor-based device including, for example, a mobile device, a wearable device, a tablet computer, a desktop computer, a laptop computer, and/or the like.

In some implementations of the current subject matter, the distributed data storage system 100 can be configured to store replicas of the same data across the plurality of computing nodes including, for example, the first computing node 110A and the second computing node 110B. For example, replicas of the same data can be stored in a first data store 114A at the first computing node 110A and in a second data store 114B at the second computing node 110B. This data can include a snapshot of the data created at a checkpoint as well as a log of changes applied to the data subsequent to the checkpoint. Consistency across the data stored at the first computing node 110A and the second computing node 110B can be maintained based on a consensus protocol in which changes to the data are propagated from a leader node to one or more follower nodes. Examples of consensus protocols consistent with some implementations of the current subject matter are described in U.S. patent application Ser. No. 15/363,738. However, it should be appreciated that checkpoints are not synchronized across different computing nodes within the distributed data storage system 100. As such, the first computing node 110A and the second computing node 110B can maintain different checkpoints.

For example, in some implementations of the current subject matter, the first computing node 110A can serve as a leader node while the second computing node 110B can act as a follower node. As such, the first computing node 110A can respond to one or more requests from the client 130, for example, by applying the corresponding changes to the data stored at the first computing node 110A, for example, in the first data store 114A. These changes can include, for example, adding, deletion, and/or updating data from the first data store 114A at the first computing node 110A. Moreover, these changes can trigger one or more state transitions at a state machine 112 associated with the first computing node 110A, which can be configured to track, via the state transitions, the changes to the data in the first data store 114A. As part of the consensus protocol, changes to the data stored at the first computing node 110A serving as the leader node can be propagated to the second computing node 110B acting as a follower node. Consistency across the replicas of the data stored at the first computing node 110A and the second computing node 110B can be maintained by at least applying the same changes to the replica of the data stored at the second computing node 110B.

In some implementations of the current subject matter, the first data store 114A and/or the second data store 114B can be a key-value store configured to store data in the form of one or more key-value pairs (KVPs). For instance, the first data store 114A and/or the second data store 114B can be a hybrid key-value store in which data records that do not exceed a threshold size (e.g., 2 kilobytes and/or a different size) are stored in an in-memory key-value store and data records that do exceed the threshold size (e.g., 2 kilobytes and/or a different size) are stored in a secondary data store. It should be appreciated that an in-memory key-value store can be implemented using any type of persistence that supports low latency access including, for example, random access memory (RAM) and/or the like. Meanwhile, the secondary data store can be implemented using any type of persistence that supports high capacity storage including, for example, hard disk and/or the like.

In some implementations of the current subject matter, a log entry within a log segment can be stored as a key-value pair, for example, in a hybrid key-value store. As noted, surplus content from the log entry that exceeds a threshold size can be stored in one or more data pages that are separate from the log segment containing the log entry. Meanwhile, the log entry itself can include a page list of these data pages holding surplus content from the log entry. According to some example embodiments, the page list of the data pages holding surplus content from the log entry can be stored as part of the value in a key-value pair. The key in the key-value pair and a portion of the value of the key-value pair not exceeding a threshold size can be stored in an in-memory key-value store. Alternatively and/or additionally, the portion of the value of the key-value pair, which can include the surplus content from the log entry, can be stored in a secondary data store. It should be appreciated that log entries within the log segment can represent other types of data stores instead of and/or in addition to a key-value store and/or a hybrid key-value store. For instance, one or more log entries from a log segment can represent a database table.

Storing surplus data from a large log entry in a log segment held in a hybrid key-value store can enable a constant streaming of large quantities of data. For example, while data is being streamed, data exceeding a threshold size (e.g., surplus content from each log entry in the log segment) can be written directly to a secondary memory store whereas the log entries themselves can be generated at the end, after the streaming of data have completed.

Referring again to FIG. 1, each computing node within the distributed data storage system 100 can be coupled with a data engine. For example, as shown in FIG. 1, a data engine 120 can deployed at the first computing node 110A, for example, in the first data store 114A. It should be appreciated that another data engine (e.g., another instance of the data engine 120) can be deployed at the second computing node 110B, for example, in the second data store 114B. In some implementations of the current subject matter, the data engine 120 can be configured to handle data required to perform crash recovery at the first computing node 110A included in the distributed data storage system 100. For example, the data required to perform crash recovery at the first computing node 110A can include a snapshot of the data stored at the first computing node 110A created at a checkpoint prior to a crash at the first computing node 110A as well as a log of changes applied to the data at the first computing node 110A subsequent to the checkpoint. Meanwhile, a replica of the data stored at the first computing node 110A can be stored at the second computing node 110B, for example, in the second data store 114B. Accordingly, the second computing node 110B may maintain a separate snapshot of the data stored at the second computing node 110B and a log of the changes applied to the data stored at the second computing node 110B.

As shown in FIG. 1, in some implementations of the current subject matter, the data engine 120 can include a log controller 122 and a restart manager 124. The log controller 122 can be configured to generate a log of the changes applied to the data stored at the first computing node 110A. Replicas of contents of the log can be stored at the first computing node 110A and the second computing node 110B. Furthermore, additions to the log can be propagated from the first computing node 110A serving as the leader node in a consensus protocol to the second computing node 110B acting as the follower node in the consensus protocol. Meanwhile, the restart manager 124 can be configured to perform crash recovery at the first computing node 110A. Although not shown, a different restart manager can perform crash recover at the second computing node 110B. For example, in the event of a crash at the first computing node 110A, the restart manager 124 can restore the data in the first data store 114A to a state prior to the crash by at least applying the changes recorded in the log to a snapshot of the data created at a checkpoint prior to the crash. Alternatively and/or additionally, the restart manager at the second computing node 110B can also perform crash recovery at the second computing node 110B by at least restoring, based at least on the log stored at the second computing node 110B, the data in the second data store 114B to a state prior to a crash at the second computing node 110B.

In some implementations of the current subject matter, a log can include a series of log entries and be divided into a plurality of log segments for storage in a corresponding plurality of log pages. As noted, as the leader node in the consensus protocol, the first computing node 110A can respond to one or more requests from the client 130 by at least applying the corresponding changes to the data stored at the first computing node 110A, for example, in the first data store 114A. The first computing node 110A can also record these changes as one or more log entries in the log stored at the first computing node 110B. Furthermore, since the first computing node 110A is the leader node in the consensus protocol, these changes can be propagated to the second computing node 110B acting as the follower node in the consensus protocol. The second computing node 110B can also record these changes as one or more log entries to a replica of the log stored at the second computing node 110B.

Figure 2:
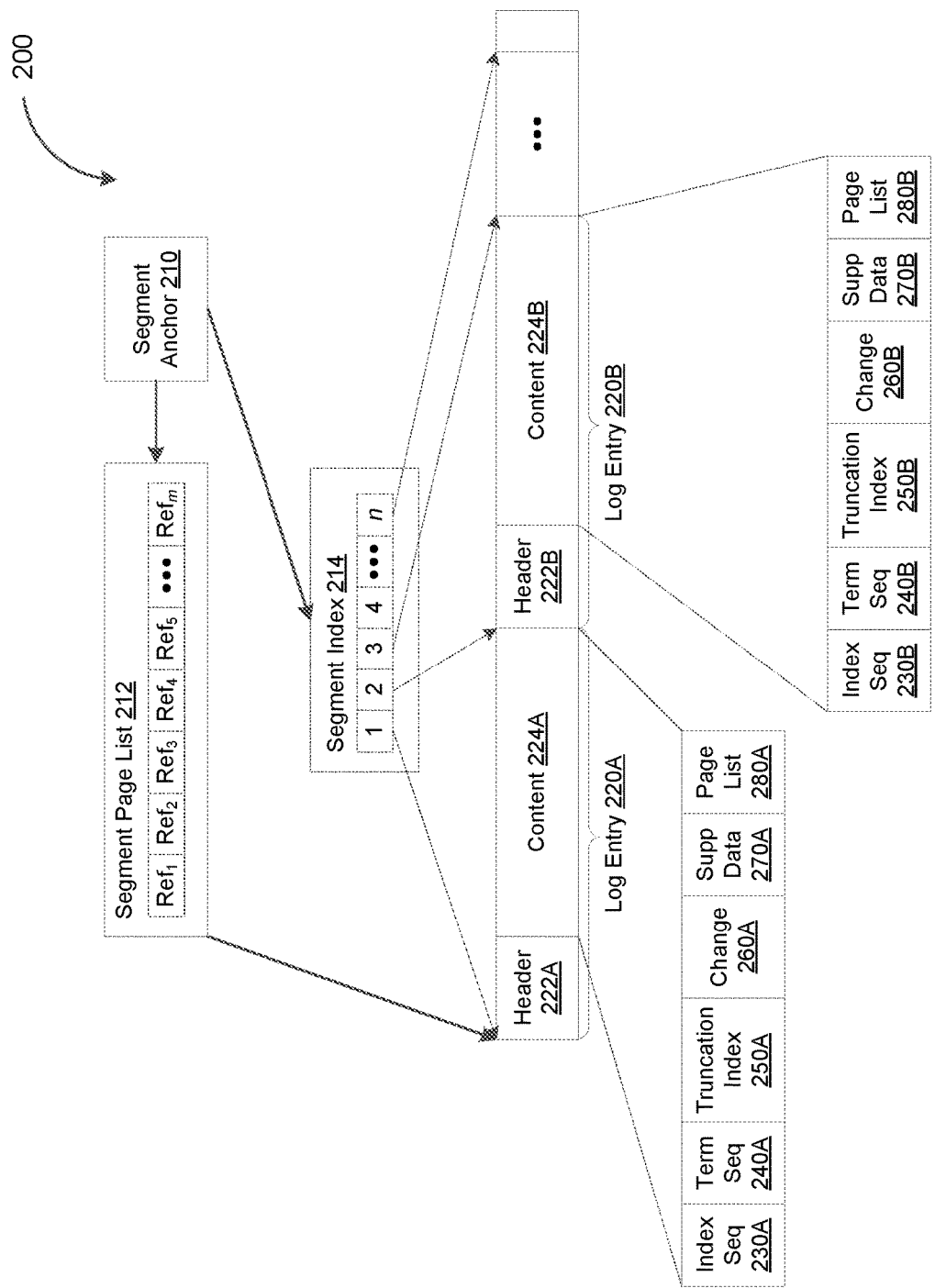
FIG. 2 depicts a log segment consistent with some implementations of the current subject matter.

To further illustrate, FIG. 2 depicts a log segment 200 consistent with some implementations of the current subject matter. Referring to FIGS. 1-2, the log segment 200 can be part of a log of changes applied to the data stored at the first computing node 110A, for example, at the first data store 114A. For example, the log segment 200 can include an n quantity of log entries including, for example, a first log entry 220A and a second log entry 220B. Each of the plurality of log entries within the log segment 200 can correspond to one of a series of changes applied to the data stored at the first computing node 110A. In order to maintain consistency across the replicas of data stored at the first computing node 110A and the second computing node 110B, a replica of the log including the log entries held in the log can also be stored at the second computing node 110B, for example, in the second data store 114B. For instance, upon adding the first log entry 220A and/or the second log entry 220B to the log segment 200 stored at the first computing node 110A, the first log entry 220A and/or the second log entry 220B can also be propagated to the second computing node 110B.

As shown in FIG. 2, the log segment 200 can be associated with a segment anchor 210, which anchors the log segment 200 by at least storing a page reference (e.g., an indirect page reference) to one or more data pages storing a segment page list 212 and/or a segment index 214. The segment page list 212 can include an m quantity of page references (e.g., $Ref_1$, $Ref_2$, . . . , $Ref_m$) to a corresponding m quantity of data pages storing the log segment 210. The segment page list 212 can be used for pinning pages referenced by the log segment 200, for example, by holding a single page list per log segment.

Alternatively and/or additionally, the segment index 214 can include pointers (e.g., offsets) to each of the plurality of log entries included in the log segment 200 including, for example, the first log entry 220A and the second log entry 220B. The segment index 214 can provide direct access to log entries in the log segment 200 based on individual log entry indices. It should be appreciated that the segment index 214 can be a transient structure that is generated, for example, by the restart manager 124, during crash recovery at the first computing node 110A and/or the second computing node 110B. The restart manager 124 can perform crash recovery based at least on the segment page list 212 and/or the segment index 214. For example, the restart manager 124 can perform crash recovery retrieve, based at least on the segment page list 212 and/or the segment index 214, one or more log entries included in the log segment 200 such as, for example, the first log entry 220A and the second log entry 220B. Furthermore, the restart manager 124 can perform crash recovery by at least applying, to the data stored at the first computing node 110A and/or the second computing node 110B, the changes corresponding to the one or more log entries included in the log segment 200.

In some implementations of the current subject matter, each log entry can include a header and a content. The header of a log entry can include a size of the log entry (e.g., in quantity of bytes) as well as a checksum of the content of the log entry. For example, as shown in FIG. 2, the first log entry 220A can include a first header 222A and a first content 224B while the second log entry 220B can include a second header 222B and a second content 224B. The first header 222A can include a size of the first log entry 220A and a checksum of the first content 224A. Alternatively and/or additionally, the second header 222B can include a size of the second log entry 220B and a checksum of the second content 224B.

Furthermore, in some implementations of the current subject matter, the content of a log entry can include an index sequence, a term sequence, a truncation index, a change, supplemental data, and/or a page list. For example, as shown in FIG. 2, the first content 224A of the first log entry 220A can include a first index sequence 230A, a first term sequence 240A, a first truncation index 250A, a first change 260A, a first supplemental data 270A, and a first page list 280A. The first change 260A can correspond to any request from the client 130 to change (e.g., add, delete, update, and/or the like) the data stored at the first computing node 110A. Meanwhile, the first supplemental data 270A can include any additional data required to redo the first change 260A, for example, during a crash recovery. For example, the first supplemental data 270A can include transactional information, state machine internal hints to prevent expensive lookups, and/or the like. Where the first log entry 220A exceeds a threshold size, any surplus content from the first log entry 220A can be stored in one or more data pages apart from the log segment 200. These data pages can be located, for example, during crash recovery based on the first page list 280A, which can include one or more page references to the data pages storing the surplus content from the first log entry 220A.

Alternatively and/or additionally, the second content 224B of the second log entry 220B can include a second index sequence 230B, a second term sequence 240B, a second truncation index 250B, a second change 260B, a second supplemental data 270B, and a second page list 280B. The second change 260B can correspond to any request from the client 130 to change (e.g., add, delete, update, and/or the like) the data stored at the first computing node 110A, for example, subsequent to the first change 260A associated with the first log entry 220A. Any additional data required to replicate the second change 270B can be part of the second supplemental data 270B. If the second log entry 220B exceeds the threshold size, page references to the one or more data pages storing surplus content from the second log entry 220B can be part of the second page list 280B.

In some implementations of the current subject matter, the log controller 122 can add the first log entry 220A and/or the second log entry 220B to the log segment 200 in response to one or more requests from the client 130 to change the data stored at the first computing node 110A, for example, in the first data store 114A. For example, the log controller 122 can add the first log entry 220A to the log segment 200 in response to a change corresponding to the first change 260A. Alternatively and/or additionally, the log controller 122 can add the second log entry 220B to the log segment 200 in response to a change corresponding to the second change 260B. As noted, the first log entry 220A and/or the second log entry 220B can be propagated to the second computing node 110B in order to maintain consistency across the replicas of the data stored at the first computing node 110A and the second computing node 110B.

In some implementations of the current subject matter, only valid log entries from the log segment 200 can be replayed during crash recovery. The validity of a log entry can be determined based on the header (e.g., checksum, valid size, and/or the like), index sequence, term sequence, and truncation index associated with the log entry. For example, referring again to FIG. 2, the restart manager 124 can replay, during crash recovery, the first log entry 220A and/or the second log entry 220B if those log entries are determined to be valid. The restart manager 124 can determine the validity of the first log entry 220A based at least on the first index sequence 230A, the first term sequence 240A, and/or the first truncation index 250A associated with the first log entry 220A. Alternatively and/or additionally, the restart manager 124 can determine the validity of the second log entry 220B based at least on the second index sequence 230B, the second term sequence 240B, and/or the second truncation index 250B. According to some implementations of the current subject matter, a log entry is valid if the header is valid (e.g., checksum matches the checksum of log entry data, size in header is a valid size, and/or the like.), index sequence, term sequence, and/or the truncation index associated with the log entry is equal to and/or greater than the index sequence, term sequence, and/or truncation index associated with the preceding log entry. For example, the second log entry 220B can be a valid log entry if the second index sequence 230B is greater than the first index sequence 230A of the first log entry 220A, the second term sequence 240B is equal to and/or greater than the first term sequence 240A of the first log entry 220A, and/or the second truncation index 250B is equal to and/or greater than the first truncation index 250A of the first log entry 220A.

In some implementations of the current subject matter, each log entry in the log can be associated with an index sequence indicating an order in which the corresponding changes are applied. For instance, the first index sequence 230A associated with the first log entry 220A can be less than the second index sequence associated with the second log entry 220B because the first change 260A associated with the first log entry 220A is applied to the data stored at the first computing node 110A before the second change 260B associated with the second log entry 220B is applied to the data. As such, a log entry can be invalid (e.g., out of order) if the log entry is associated with an index sequence that is less than and/or equal to the index sequence associated with a preceding log entry and/or greater than the index sequence associated with a subsequent log entry. For example, during crash recovery at the first computing node 110A and/or the second computing node 110B, the restart manager 124 can determine that the second log entry 220B is invalid based at least on the second index sequence 230B being less than the first index sequence 230A of the first log entry 220A. Accordingly, when restoring the data stored at the first computing node 110A and/or the second computing node 110B, the restart manager 124 can replay every log entry included in the log up until the second log entry 220B.

In some implementations of the current subject matter, a log entry can be invalid if the log entry had not been fully replicated across the plurality of computing nodes in the distributed data storage system 100. For example, the second log entry 220B can be added to the log segment 200 stored at the first computing node 110A but a crash can occur at the first computing node 110A and/or the second computing node 110B before the second log entry 220B is propagated to the second computing node 110B. Accordingly, the first truncation index 250A of the first log entry 220A can be incremented to be greater than the second truncation index 250B of the second log entry 220B in order to indicate that the first truncation index 250A is the last valid log entry in the log. During crash recovery, the restart manager 124 can determine, based at least on the second truncation index 250B being less than the first truncation index 250A, that the second log entry 220B is an invalid log entry. As such, the restart manager 124 can restore the data at the first computing node 110A and/or the second computing node 110B by at least replaying every log entry included in the log up until the first log entry 220A which, as noted, is determined to be the last valid log entry within the log.

In some implementations of the current subject matter, the first term sequence 240A and/or the second term sequence 240B can correspond to a term held by the current leader node within the distributed computing system 100. For example, when the second computing node 110B is elected as the new leader node and takes over from the first computing node 110A, the term of the second computing node 110B can be greater than the term of the first computing node 110A. Accordingly, if the term sequence of a log entry is lower than the term sequence of other log entries, then the log entry can be generated under a different leader node and can therefore be invalid. Alternatively and/or additionally, the term sequence of the log entry may be lower but the index sequence of the log entry can also be lower than its truncation index. This can mean that the log had been truncated to a common index determined by a consensus protocol at a last restart. Thus, the log entry cannot replayed in this case because the log entry diverged from a global consensus.

Figure 3:
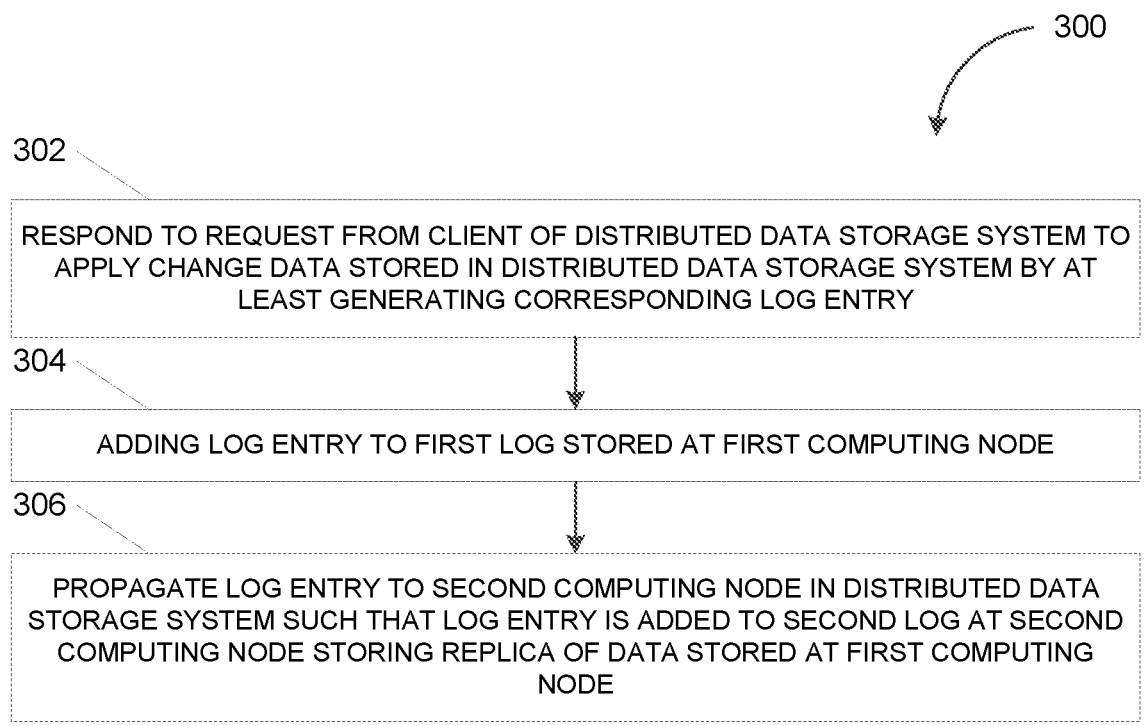
FIG. 3 depicts a flowchart illustrating a process for generating a log consistent with some implementations of the current subject matter.

FIG. 3 depicts a flowchart illustrating a process 300 for generating a log consistent with some implementations of the current subject matter. Referring to FIGS. 1-3, the process 300 can be performed by the data engine 120, for example, by the log controller 122. In some implementations of the current subject matter, the data engine 120 can perform the process 300 in order to generate a log and/or a portion of the log recording the changes applied to data stored at the first computing node 110A. Furthermore, the data engine 120 can perform the process 300 in order to propagate the log and/or portions of the log to the second computing node 110B which, as noted, can store a replica of the data stored at the first computing node 110A.

The data engine 120 can respond to a request from a client of the distributed data storage system 100 to apply a change to data stored in the distributed data storage system 100 by at least generating a corresponding log entry (302). For example, the distributed data storage system 100 can receive, from the client 130, a request to change (e.g., add, delete, update, and/or the like) the data stored in the distributed data storage system 100, for example, at the first computing node 110A and/or the second computing node 110B. The data engine 120, for example, the log controller 122, can respond to the request from the client 130 by at least generating a corresponding log entry. For instance, the data engine 120 can generate the first log entry 220A in response to a request from the client 130 to change the data stored in the distributed data storage system 100. Alternatively and/or additionally, the data engine 120 can generate the second log entry 220B in response to a next request from the client 130 for additional changes to the data stored in the distributed data storage system 100.

The data engine 120 can add the log entry to a first log stored at the first computing node (304). For instance, in some implementations of the current subject matter, the first computing node 110A can store a log that records the changes that are applied to the data stored at the first computing node 110A, for example, in the first data store 114A. As such, the data engine 120, for example, the log controller 122 can add the first log entry 220A and/or the second log entry 220B to the log and/or a portion of that log such as, for example, the log segment 220. In some implementations of the current subject matter, in order to restore the data stored at the first computing node 110A in the event of a crash, the data engine 120, for example, the restart manager 124, can replay the log stored at the first computing node 110A including, for example, the first log entry 220A and/or the second log entry 220B.

The data engine 120 can propagate the log entry to a second computing node in the distributed data storage system 100 such that the log entry is added to a second log at the second computing node storing a replica of the data stored at the first computing node (306). As noted, in some implementations of the current subject matter, the distributed data storage system 100 can store replicas of the same data at the first computing node 110A and the second computing node 110B. As such, the first computing node 110A and the second computing node 110B can participate in a consensus protocol in which the first computing node 110A serves as the leader node and the second computing node 110B acts as a follower node.

In accordance with the consensus protocol, the first computing node 110A can, as the leader node, respond to the request from the client 130 by at least applying the corresponding change to the replica of the data stored at the first computing node 110A, for example, in the first data store 114A. Furthermore, the log entry corresponding to the change that is applied to the data stored at the first computing node 110A can be propagated to the second computing node 110B and added to a log stored at the second computing node 110B. When a crash occurs at the second computing node 110A, the data engine 120, for example, the restart manager 124, can replay the log stored at the second computing node 110B also including, for example, the first log entry 220A and/or the second log entry 220B. However, it should be appreciated that a crash can occur at the first computing node 110A and/or the second computing node 110B before the log entry is propagated from the first computing node 110A to the second computing node 110B. As such, during crash recovery, the data engine 120, for example, the restart manager 124, can avoid replaying invalid log entries, which can include log entries that have not be fully propagated to every computing node storing replicas of the same data.

Figure 4:
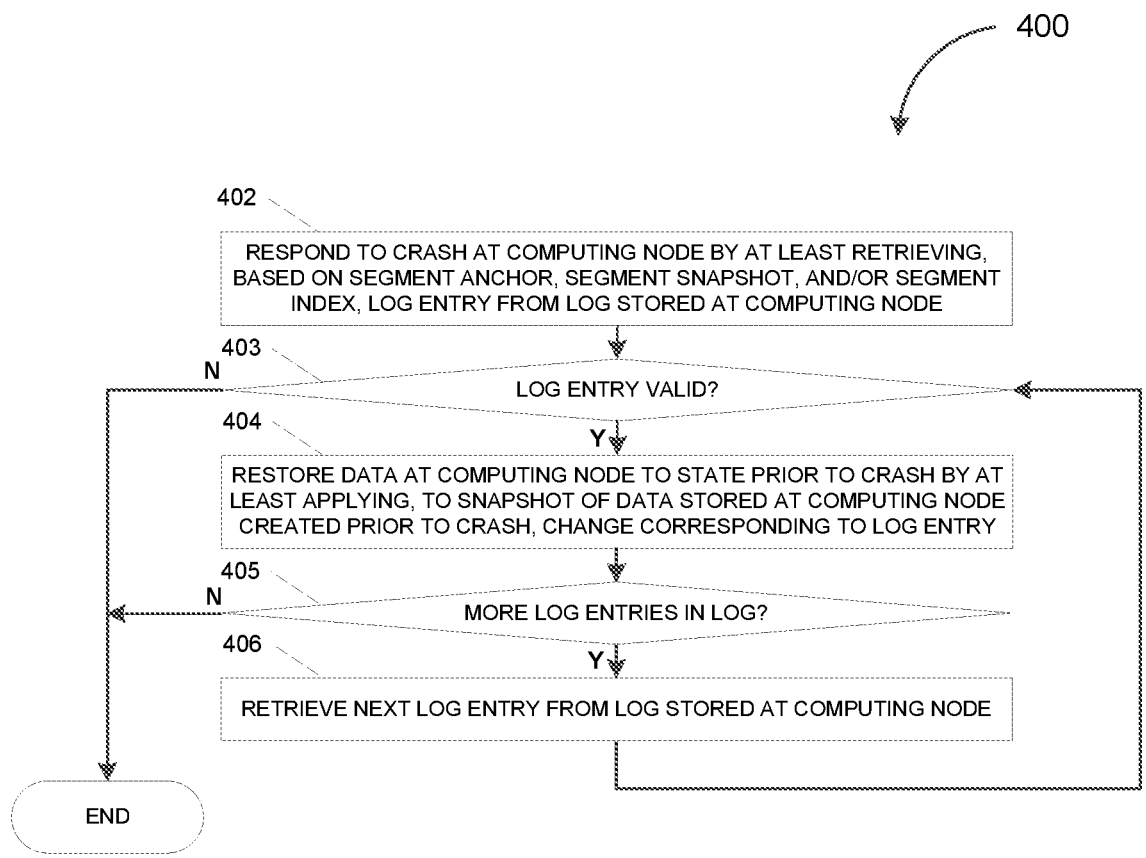
FIG. 4 depicts a flowchart illustrating a process for performing crash recovery at a computing node within a distributed data storage system consistent with some implementations of the current subject matter.

FIG. 4 depicts a flowchart illustrating a process 400 for performing crash recovery at a computing node within a distributed data storage system consistent with some implementations of the current subject matter. Referring to FIGS. 1-2 and 4, the process 400 can be performed by the data engine 120, for example, by the restart manager 124. In some implementations of the current subject matter, the data engine 120 can perform the process 400 in the event of a crash at the first computing node 110A and/or the second computing node 110B. The data engine 120 can perform the process 400 in order to restore the data stored at the first computing node 110A and/or the second computing node 110B to a state prior to the crash.

The data engine 120 can respond to a crash at a computing node by at least retrieving, based on a segment anchor, a segment snapshot, and/or a segment index, a log entry from a log stored at the computing node (402). For example, in some implementations of the current subject matter, the data engine 120, for example, the restart engine 124, can respond to a crash at the first computing node 110A and/or the second computing node 110B by at least retrieving, based at least on the segment anchor 210, the segment page list 212, and/or the segment index 214, the log segment 200. The log segment 200 can include an n quantity of log entries including, for example, the first log entry 220A and the second log entry 220B. As such, the data engine 120, for example, the restart engine 124, can commence crash recovery at the first computing node 110A and/or the second computing node 110B by at least retrieving, from the log segment 200, the first log entry 220A. Alternatively and/or additionally, the data engine 120 can continue the crash recovery at the first computing node 110A and/or the second computing node 110B by at least retrieving, from the log segment 200, the second log entry 220B. In some implementations of the current subject matter, the crash recovery at the first computing node 110A and/or the second computing node 110B can further include truncating the log to an index determined by a consensus protocol. However, it should be appreciated that the log truncation index can be checked during a replay of the log in order to avoid replaying too many log entries from the log that diverge from a global consensus.

The data engine 120 can determine whether the log entry is valid (403). For example, the data engine 120 can determine whether the first log entry 220A is valid based at least on the first index sequence 230A, the first term sequence 240A, and/or the first truncation index 250A. Alternatively, the data engine 120 can determine whether the second log entry 220B is valid based at least on the second index sequence 230B, the second term sequence 240B, and/or the second truncation index 250B.

If the data engine 120 determines that the log entry is invalid (403-N), the process 400 can terminate. In some implementations of the current subject matter, the data engine 120, for example, the restart manager 124 can determine that a log entry is invalid if the index sequence, term sequence, and/or truncation index associated with the log entry is less than the index sequence, term sequence, and/or truncation index associated with a preceding log entry. Accordingly, the process 400 can terminate in the event that the data engine 120 determines that the first log entry 220A and/or the second log entry 220B are invalid.

Alternatively and/or additionally, if the data engine 120 determines that the log entry is valid (403-Y), the data engine 120 can restore the data stored at the computing node to a state prior to the crash by at least applying, to a snapshot of the data stored at the computing node created prior to the crash, a change corresponding to the log entry (404). In some implementations of the current subject matter, the data engine 120, for example, the restart manager 124, can determine that a log entry is valid if the index sequence, term sequence, and/or the truncation index associated with the log entry is equal to and/or greater than the index sequence, term sequence, and/or truncation index associated with the preceding log entry. As such, if the data engine 120 determines that the first log entry 220A and/or the second log entry 220B are valid, the data engine 120 can replay the first log entry 220A and/or the second log entry 220B.

Replaying the first log entry 220A and/or the second log entry 220B can include applying, to the data stored at the first computing node 110A and/or the second computing node 110B, the corresponding first change 260A and/or second change 260B. It should be appreciated that the first supplemental data 270A and/or the second supplemental data 270B can be used to redo the first change 260A and/or the second change 260B. Furthermore, replaying the first log entry 220A and/or the second log entry 220B can include retrieving, based at least on the first page list 280A and/or the second page list 280B, the one or more data pages storing surplus content from the first log entry 220A and/or the second log entry 220B, which is stored apart from the log segment 200 containing the first log entry 220A and the second log entry 220B.

The process 400 can continue at operation 405 where the data engine 120 can determine if one or more log entries remain in the log stored at the computing node (405). The process 400 can terminate if the data engine 120 determines that no log entries remain in the log stored at the computing node (405-N). By contrast, if the data engine 120 determines that one or more log entries remain in the log stored at the computing node (405-Y), the data engine 120 can retrieve a next log entry from the log stored at the computing node (406). Furthermore, the process 400 can resume at operation 403 where the data engine 120 determines whether that log entry is valid.

Figure 5:
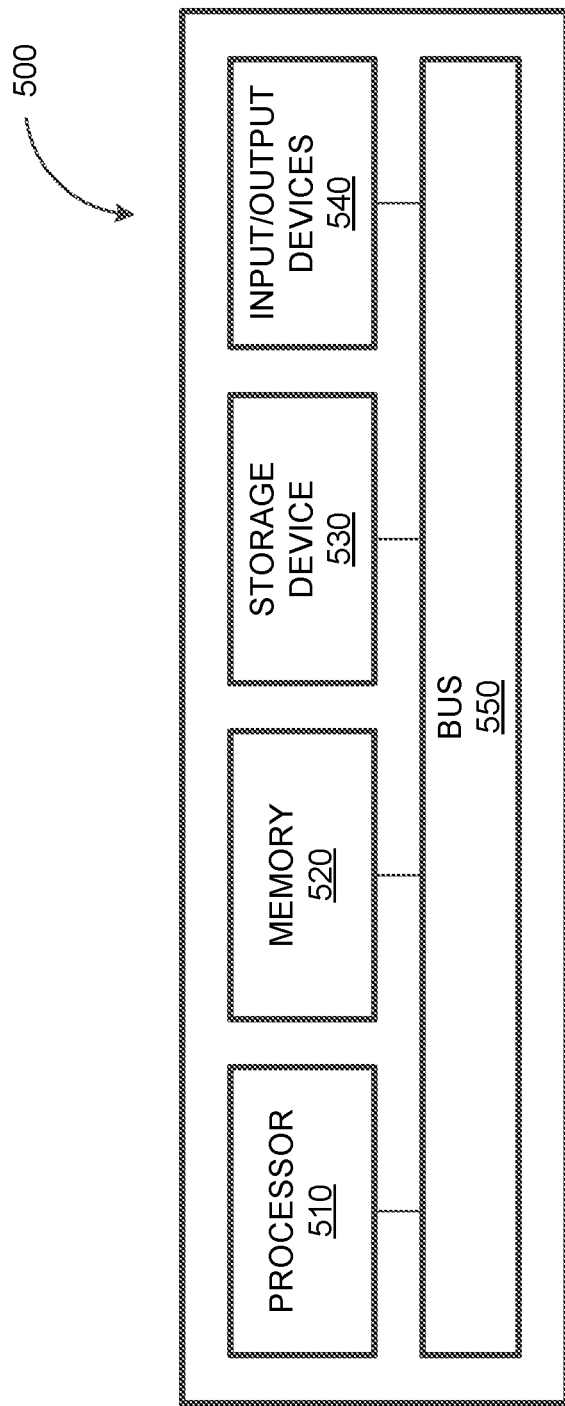
FIG. 5 depicts a block diagram illustrating a computing system consistent with some implementations of the current subject matter.

FIG. 5 depicts a block diagram illustrating a computing system 500 consistent with implementations of the current subject matter. Referring to FIGS. 1 and 5, the computing system 500 can be used to implement the distributed data storage system 100, for example, the data engine 120, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the distributed data storage system 100. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A distributed data storage system, comprising:
   at least one data processor; and
   at least one memory storing instructions which, when executed by the at least one data processor, cause operations comprising:
   responding to a request from a client to apply a change to data stored in the distributed data storage system by at least generating a first log entry corresponding to the change, a replica of the data being stored at each of a plurality of computing nodes comprising the distributed data storage system;

adding the first log entry to a first log stored at a first computing node in the plurality of computing nodes;

propagating, to a second computing node in the plurality of computing nodes, the first log entry, the first log entry being propagated to the second computing node in order to add the first log entry to a second log stored at the second computing node;

upon propagating the first log entry across the plurality of computing nodes, incrementing a first truncation index of the first log entry to at least identify the first log entry as being a last valid log entry in the first log and the second log; and performing, based at least on the first log and/or the second log, a crash recovery at the first computing node and/or the second computing node, the performing of the crash recovery includes applying, to a snapshot of the data created at a checkpoint prior to a crash at the first computing node and/or the second computing node, the change associated with the first log entry in response to the first truncation index associated with the first log entry being equal to and/or greater than a second truncation index associated with a second log entry preceding the first log entry in the first log and/or the second log.

2. The system of claim 1, wherein the first log and the snapshot of the data stored at the first computing node are stored in a same data store at the first computing node.

3. The system of claim 1, wherein the performing of the crash recovery further includes omitting a replay of a third log entry succeeding the first log entry in the first log and/or the second log based at least on the first truncation index associated with the first log entry being greater than a third truncation index associated with the second log entry.

4. The system of claim 1, wherein the first log entry comprises a log segment storing a portion of the first log and/or the second log.

5. The system of claim 4, further comprising:
retrieving the first log entry based at least on a segment anchor and/or a segment snapshot associated with the log segment, the segment snapshot including one or more page references to data pages at the first computing node and/or the second computing node storing the log segment, and the segment anchor storing a page reference to data pages at the first computing node and/or the second computing node storing the segment snapshot.

6. The system of claim 5, further comprising:
generating a segment index including an offset associated with first log entry, the segment index being generated in response to the performance of the crash recovery at the first computing node and/or the second computing node, and the retrieval of the first log entry being further based on the segment index.

7. The system of claim 1, wherein the first log entry comprises a header and a content, and wherein the header includes a size of the first log entry and a checksum of the content comprising the first log entry.

8. The system of claim 7, wherein the first log entry further comprises a page list based at least on the content of the first log entry exceeding a threshold size, and wherein the page list includes one or more page references to data pages storing surplus content from the first log entry.

9. The system of claim 8, wherein the first log entry represents an operation on a state machine, wherein the state machine tracks a state of data in a key-value store, wherein the page list is stored as part of a value comprising the key-value pair, wherein a key of the key-value pair and a portion of the value including the page list is stored in an in-memory key-value store, and wherein the page list is reused instead of being copied.

10. The system of claim 1, wherein the first computing node comprises a leader node in a consensus protocol, wherein the second computing node comprises a follower node in the consensus protocol, wherein the consensus protocol includes the leader node responding to the request from the client and the corresponding change being propagated to the follower node, and wherein the consensus protocol is applied in order to maintain consistency across the replica of the data stored at each of the first computing node and the second computing node.

11. A computer-implemented method, comprising:
responding to a request from a client to apply a change to data stored in the distributed data storage system by at least generating a first log entry corresponding to the change, a replica of the data being stored at each of a plurality of computing nodes comprising the distributed data storage system;

adding the first log entry to a first log stored at a first computing node in the plurality of computing nodes;

propagating, to a second computing node in the plurality of computing nodes, the first log entry, the first log entry being propagated to the second computing node in order to add the first log entry to a second log stored at the second computing node;

upon propagating the first log entry across the plurality of computing nodes, incrementing a first truncation index of the first log entry to at least identify the first log entry as being a last valid log entry in the first log and the second log; and performing, based at least on the first log and/or the second log, a crash recovery at the first computing node and/or the second computing node, the performing of the crash recovery includes applying, to a snapshot of the data created at a checkpoint prior to a crash at the first computing node and/or the second computing node, the change associated with the first log entry in response to the first truncation index associated with the first log entry being equal to and/or greater than a second truncation index associated with a second log entry preceding the first log entry in the first log and/or the second log.

12. The method of claim 11, wherein the first log and the snapshot of the data stored at the first computing node are stored in a same data store at the first computing node.

13. The method of claim 11, wherein the performing of the crash recovery further includes omitting a replay of a third log entry succeeding the first log entry in the first log and/or the second log based at least on the first truncation index associated with the first log entry being greater than a third truncation index associated with the second log entry.

14. The method of claim 11, wherein the first log entry comprises a log segment storing a portion of the first log and/or the second log.

15. The method of claim 14, further comprising:
retrieving the first log entry based at least on a segment anchor and/or a segment snapshot associated with the log segment, the segment snapshot including one or more page references to data pages at the first computing node and/or the second computing node storing the log segment, and the segment anchor storing a page reference to data pages at the first computing node and/or the second computing node storing the segment snapshot; and generating a segment index including an offset associated with first log entry, the segment index being generated in response to the performance of the crash recovery at the first computing node and/or the second computing node, and the retrieval of the first log entry being further based on the segment index.

16. A non-transitory computer-readable medium storing instructions, which when executed by at least one data processor, result in operations comprising:

responding to a request from a client to apply a change to data stored in the distributed data storage system by at least generating a first log entry corresponding to the change, a replica of the data being stored at each of a plurality of computing nodes comprising the distributed data storage system;

adding the first log entry to a first log stored at a first computing node in the plurality of computing nodes;

propagating, to a second computing node in the plurality of computing nodes, the first log entry, the first log entry being propagated to the second computing node in order to add the first log entry to a second log stored at the second computing node;

upon propagating the first log entry across the plurality of computing nodes, incrementing a first truncation index of the first log entry to at least identify the first log entry as being a last valid log entry in the first log and the second log; and performing, based at least on the first log and/or the second log, a crash recovery at the first computing node and/or the second computing node, the performing of the crash recovery includes applying, to a snapshot of the data created at a checkpoint prior to a crash at the first computing node and/or the second computing node, the change associated with the first log entry in response to the first truncation index associated with the first log entry being equal to and/or greater than a second truncation index associated with a second log entry preceding the first log entry in the first log and/or the second log.

* * * * *